United States Patent
Cragg

(10) Patent No.: US 9,527,343 B2
(45) Date of Patent: Dec. 27, 2016

(54) VEHICLE WHEEL

(75) Inventor: Stephen R. Cragg, Shrosphire (GB)

(73) Assignee: GKN Land Systems Limited, Telford (GB)

( * ) Notice: Subject to any disclaimer, the term of this patent is extended or adjusted under 35 U.S.C. 154(b) by 414 days.

(21) Appl. No.: 13/701,494

(22) PCT Filed: Jun. 1, 2011

(86) PCT No.: PCT/GB2011/051032
§ 371 (c)(1),
(2), (4) Date: Feb. 11, 2013

(87) PCT Pub. No.: WO2011/151644
PCT Pub. Date: Dec. 8, 2011

(65) Prior Publication Data
US 2013/0140875 A1  Jun. 6, 2013

(30) Foreign Application Priority Data
Jun. 1, 2010 (GB) .................................. 1009124.7

(51) Int. Cl.
*B60B 11/00* (2006.01)
*B60B 25/12* (2006.01)
*B60B 25/04* (2006.01)
*B60B 11/06* (2006.01)

(52) U.S. Cl.
CPC ............... *B60B 11/00* (2013.01); *B60B 11/06* (2013.01); *B60B 25/045* (2013.01); *B60B 25/12* (2013.01)

(58) Field of Classification Search
CPC ........ B60B 11/00; B60B 11/06; B60B 25/045; B60B 25/10; B60B 25/12

USPC ... 301/10.1, 11.1, 13.1, 13.2, 36.1; 152/396, 152/409, 410
See application file for complete search history.

(56) References Cited

U.S. PATENT DOCUMENTS

| | | | | |
|---|---|---|---|---|
| 2,835,303 A | * | 5/1958 | Woodward | 152/410 |
| 3,468,584 A | * | 9/1969 | Tantlinger | 301/6.1 |
| 4,003,421 A | * | 1/1977 | Lejeune | 152/409 |
| 4,438,797 A | * | 3/1984 | Suckow | 152/410 |
| 5,086,821 A | * | 2/1992 | Russell et al. | 152/410 |
| 6,148,941 A | * | 11/2000 | Hinton et al. | 180/65.51 |
| 6,293,324 B1 | | 9/2001 | Taylor | |
| 6,296,320 B1 | * | 10/2001 | Miyashita et al. | 301/95.105 |
| 6,568,764 B2 | * | 5/2003 | McNeil et al. | 301/36.1 |
| 2003/0010564 A1 | * | 1/2003 | Hinton et al. | 180/363 |
| 2003/0140998 A1 | * | 7/2003 | Oba et al. | 152/410 |

(Continued)

FOREIGN PATENT DOCUMENTS

| CN | 1418155 A | 5/2003 |
|---|---|---|
| FR | 2 293 324 A1 | 7/1976 |

(Continued)

OTHER PUBLICATIONS

International Search Report for PCT/GB2011/051032, mailed Sep. 5, 2011.

(Continued)

*Primary Examiner* — Kip T Kotter
(74) *Attorney, Agent, or Firm* — Marshall, Gerstein & Borun LLP

(57) ABSTRACT

A wheel for a vehicle, including a rim (10) having axially-spaced support portions (12, 14) on which respective annular tire—supporting elements (34,36) are engageable; wherein one of the support portions is of larger diameter than the other.

6 Claims, 3 Drawing Sheets

(56) References Cited

U.S. PATENT DOCUMENTS

2003/0168143 A1* 9/2003 Vehar et al. .................. 152/410
2010/0052409 A1* 3/2010 Ikeda ........................... 301/13.2

FOREIGN PATENT DOCUMENTS

GB     1 394 269 A    5/1975
GB     2 050 965 A    1/1981

OTHER PUBLICATIONS

First Office Action for CN Application No. 201180026859.4, dated Aug. 12, 2014.
Second Office Action for CN Application No. 201180026859.4, dated Apr. 3, 2015.
Search Report for GB Application No. 1009124.7, dated Sep. 7, 2010.

\* cited by examiner

VEHICLE WHEEL

DESCRIPTION OF INVENTION

This invention relates to a wheel for a vehicle.

A wheel in accordance with the invention has been devised for use as the outermost wheel of a twin wheel assembly in a heavy transport vehicle, such as a mining or earth moving vehicle. A typical such vehicle, for load-carrying capacity and traction reasons, has, on the or each of its driving but non-steering axles, twin wheel assemblies each comprising a pair of adjacent wheels mounted on a common hub, the wheels being provided with respective tyres. Such wheels may have a rim whose diameter is some 1.6 m or more, the rolling diameter of the wheels being correspondingly greater, and each wheel may weigh substantially more than 1 tonne.

Each wheel may have a disc part which is secured to the hub by a large number, for example several tens, of fixing bolts or studs. If tyre replacement is necessitated by damage or wear, removing such a wheel in its entirety from the hub is an inconvenient and time-consuming procedure, particularly if it is the inboard wheel of twin wheels which has to be removed, necessitating prior removal of the outboard wheel and subsequent replacement of the latter after the inboard wheel has been refitted. With the inconvenience made greater by the necessity for subsequent checking of the wheel mounting bolts, for example the torque setting thereof, it has become accepted practice for the wheels to remain in situ on the hubs, while the tyres are removed from the wheels. To this end, removable tyre supporting elements are provided on the wheels, the outboard wheel having removable such elements at both its inboard and outboard edges, and the inboard wheel having at least the tyre supporting elements at its outboard edge removable. It is known, e.g. from U.S. Pat. No. 6,568,764, to provide the outboard wheel of each wheel pair with a rim of smaller diameter than that of the inboard wheel, to facilitate the removal and refitting of a tyre from and to the inboard wheel, by passing the outboard wheel through its centre, but even with this provision the operation is difficult. The tyre supporting elements at each edge of a wheel typically comprise a tyre bead seat element, a tyre wall support flange, and a retaining ring.

One difficulty arising in such an operation is that of aligning the tyre, the bead seat element, and the retaining ring component of the inboard wheel with that wheel during the refitting procedure. The tyre is, of course, heavy, and a component such as the bead seating element may weigh some 250 kg or more. They have to be handled mechanically being too heavy for manual handling, and after the tyre, bead seating element and retaining ring have been moved over the smaller diameter rim of the outboard wheel they successively have to be realigned to be moved further to engage the inboard wheel rim. Such realignment is difficult under on-site conditions. The present invention addresses such difficulties.

According to one aspect of the invention, we provide a wheel for a vehicle, the wheel including a rim having axially spaced support portions on which respective annular tyre-supporting elements are removably engaged; wherein one of the support portions is of larger diameter than the other.

Preferably, the external peripheral surface of the rim between the portions includes a transition surface portion of gradually-changing diameter. It may extend between the respective diameters of the support portions. The transition surface conveniently is frusta-conical; it may be provided on a separate transition element, connected to rim parts affording the respective support portions, by welding.

The tyre-supporting elements for each support portion of the rim may include a tyre bead seat element. A flange element which guides the tyre wall adjacent the bead at its free edge, and a retaining ring may be provided.

When a wheel in accordance with the invention is provided as the outboard wheel of a pair (or more) of wheels, the rim portion of smaller diameter will be provided at the outboard end of the wheel. Starting, it will be assumed, from the position that the tyre and tyre supporting elements of both wheels have been removed, the procedure for refitting the tyres is firstly that the tyre of the inboard wheel is positioned on the rim of the outboard wheel. Since the outboard support portion of the rim of the outboard wheel is of smaller diameter than the support portion which is nearest the inboard wheel, it is relatively easy for the tyre of the inboard wheel to be placed on the rim of the outboard wheel since a working clearance is provided by the smaller-diameter support portion of the rim. As the tyre is moved from the smaller-diameter support portion to the larger-diameter support portion of the rim, the transition surface portion of the rim facilitates such movement and helps the tyre to become aligned relative to the rim of the inboard wheel. The tyre can be held in such alignment by whatever handling equipment is being used, and moved across the gap between the rims of the outboard wheel and inboard wheel to be fitted to the rim of the inboard wheel. Subsequently the tyre supporting elements of the outboard rim part of the inboard wheel can be fitted, also by being moved across the rim of the outboard wheel.

Subsequently, the retaining ring for the inboard tyre bead seat element of the outboard wheel, followed by the bead seat element itself and flange, can be fitted to the outboard wheel. Again, in this operation, their disposition on the smaller-diameter portion of the rim can be effected relatively easily because of the greater clearance between these components and the smaller-diameter portion, then they can be moved over the transition surface portion to reach their fitted positions on the larger-diameter portion of the rim. The tyre can then be fitted, followed by the outboard tyre bead seat element of the outer rim, together with its retaining ring.

The tyre bead seat elements of the wheel may be identical to one another, with an appropriate annular spacing element being disposed between the smaller-diameter portion of the rim and the respective bead seat element. Alternatively, a special-purpose tyre bead seat element, of increased dimensions, may be provided for the smaller-diameter portion of the wheel rim.

Preferably, the inclination of the transition surface portion is such that when a rigid component such as a tyre bead seat element is passed over the transition surface, it is resistant to frictional self-locking if there is any small degree of misalignment between the transition surface portion and component.

A further aspect of the invention is concerned with addressing the difficulty caused by the fact that there is a gap between the adjacent edges of the rims of the inboard and outboard wheels, in a twin-wheel axle. Especially in the course of removal of the outboard bead seat element from the inboard wheel, where access thereto is relatively difficult for whatever handling equipment is being used, it is possible for the element to drop between the edges of the two wheel rims. Subsequently, it is difficult to lift it to the correct position and align it so that the rim of the outboard wheel fits through the centre thereof.

According to another aspect of the invention, therefore, we provide a wheel for a vehicle, including a rim having axially-spaced support portions on which respective annular tyre support elements are engageable, wherein at least one edge of the rim is provided with a guide formation extending axially from the rim edge, the guide formation having a guide surface tapering from a diameter substantially equal to the diameter of the adjacent support portion.

Preferably the guide surface is generally frusto-conical.

Preferably both the first and second aspects of the invention are combined together in a wheel.

According to another aspect of the invention, we provide a twin-wheel arrangement for a vehicle, wherein the outboard wheel is a wheel according to the first and/or second aspect of the invention. In the case of a wheel according to the first aspect of the invention, the smaller-diameter support portion of the rim will be provided at the outboard edge of the wheel, while in the case of a wheel according to the second aspect of the invention the guide member will be provided at the inboard edge of the wheel.

Preferably the larger-diameter support portion of the outboard wheel is of the same diameter as the adjacent support position of the inboard wheel.

The invention will now be described by way of example with reference to the accompanying drawings, of which:

Figure 1:
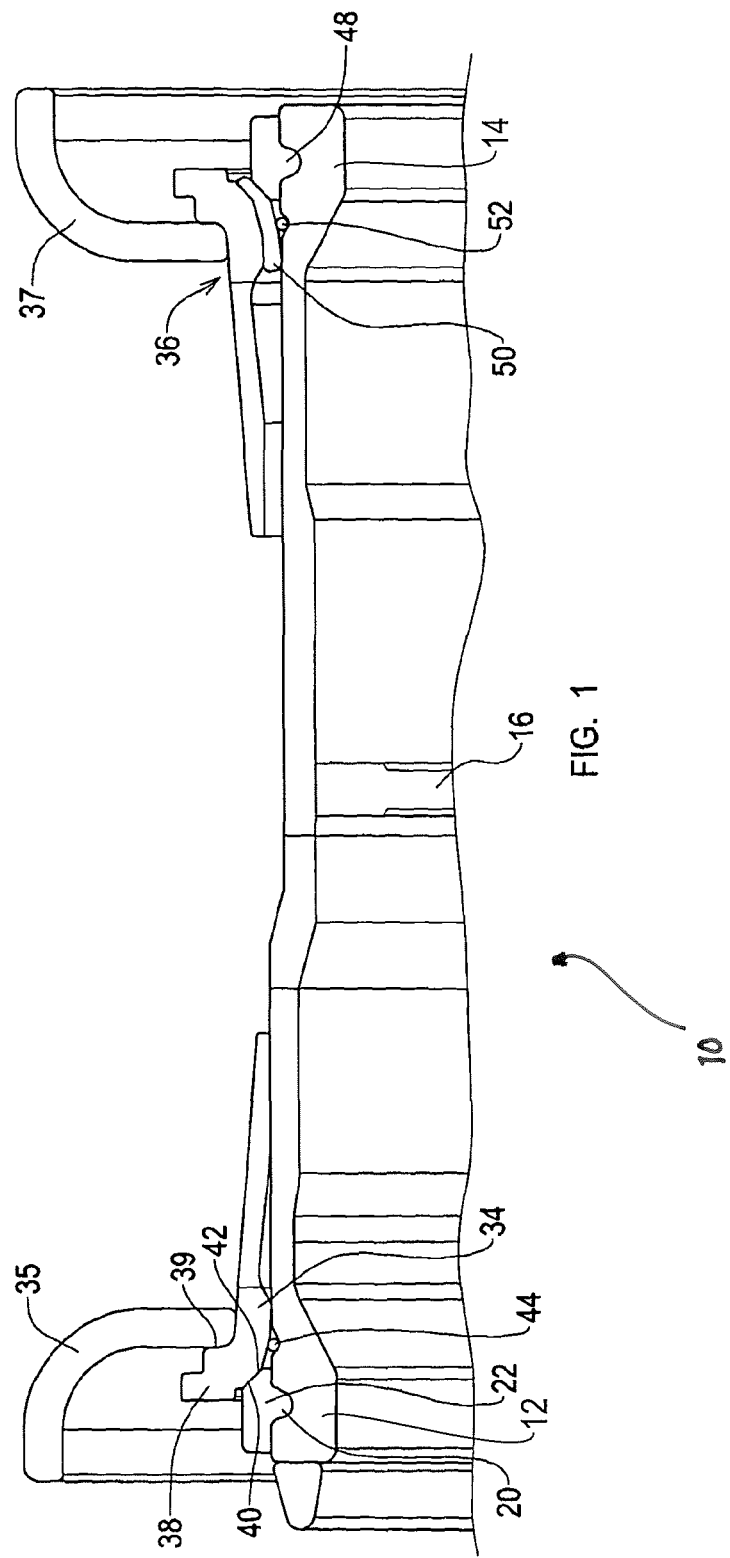
FIG. 1 is a sectional view, in a plane containing the axis of rotation, of part of a wheel in accordance with the invention.
Figure 2:
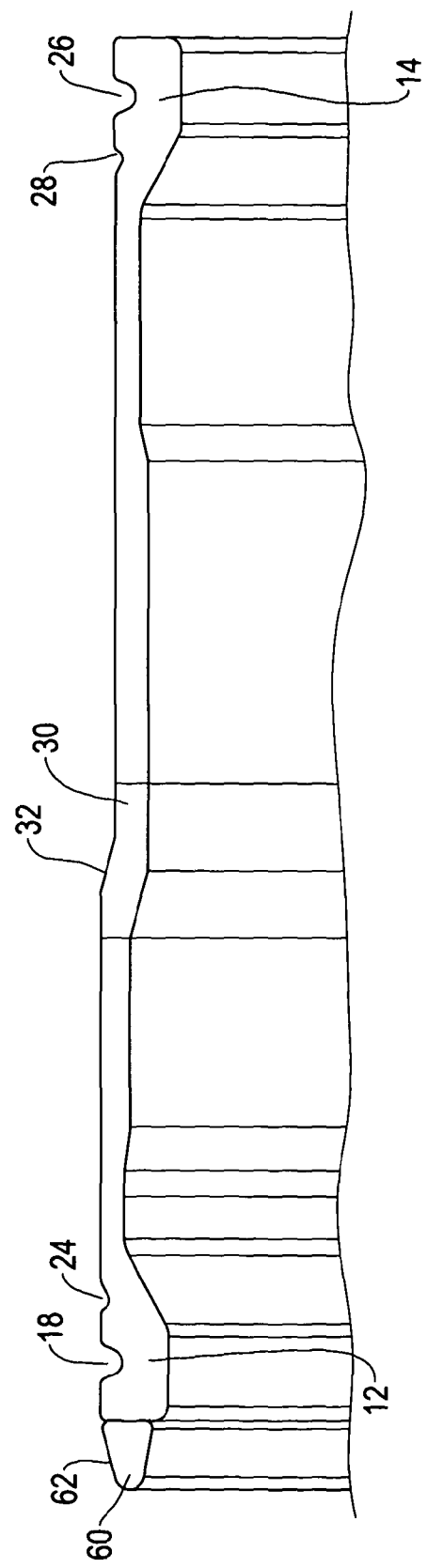
FIG. 2 is a sectional view as FIG. 1, but showing the main rim component of the wheel, alone.

Referring firstly to FIGS. 1 and 2 of the drawings, these show a wheel for a vehicle such as a large earth mover. It comprises a rim indicated generally at 10, generally of hollow cylindrical form, extending about a central axis around which it rotates when in use. The rim has support portions, 12, 14 at its opposite ends, spaced axially from one another. Generally in the mid region of the wheel between its ends, 12, 14 an annular wheel disc 16 is welded to the interior wall of the rim, the disc 16 having a plurality of circumferentially spaced apertures for receiving fixing bolts or studs by which the wheel is mounted on a rotatable hub at the end of a driving axle.

The support portions 12, 14 of the rim are of substantially the same cross-sectional shape as one another, in mirror image orientation relative to one another. The support portion 12 has an exterior annular recess 18, for co-operation with a radially inwardly extending wall portion 20 of an annular retaining ring 22 which is radially cut at one point of its circumferential extent to enable it to be expanded to fit over the free end of the portion 12 of the rim and then contracted so that wall portion 20 engages in the recess 18. Towards the centre of the wheel relative to the recess 18, the support portion 12 has a further annular recess 24 of smaller dimensions than the recess 18. The support portion 14 of the rim has recesses 26, 28 corresponding to the recesses 18, 24. The external diameter of the support portion 12 of the rim, and the adjacent region of the rim, is greater, by about 2.5 cm, than the external diameter of the support portion 14 and the adjacent part of the rim.

Between, the disc 16 and the support portion 12 of the rim, there is a transition element 30. This is an annular component, welded to the adjacent ends of respective rim components which afford the support portions 12 and 14. The transition element 30 has an external frusto-conical transition surface portion 32.

The support portions 12, 14 of the rim carry respective tyre bead seat elements 34, 36. The tyre bead seat element 34 has an abutment portion 38 with an inclined frusto-conical abutment surface 40 which engages a correspondingly inclined abutment surface 42 provided on the retaining ring 22. An elastomeric O-ring 44 received in the recess 24 provides an air tight seal between the bead seat element 34 and the rim. It will be apparent that the configuration of the retaining ring 22 and inclined abutment surface 42, and the bead seat element 38 and inclined frusto-conical abutment surface 40, is such that the retaining ring is, by virtue of the forces exerted on it by the bead seat element when a tyre is fitted to the bead seat element and inflated, urged tightly into engagement with the recess 18 and hence cannot disengage therefrom.

The tyre bead seat element 34 carried a generally L-section annular flange element 35 which abuts an axially-facing wall 39 of the bead seat element. Similarly, the bead seat element 36 carries a flange element 37. The flange elements support the respective side walls of a tyre, not shown, in the vicinity of the beads at their radially-innermost free ends.

The bead seat element 36 is identical to the bead seat element 34, disposed in mirror image of the latter. It is retained in engagement with the support portion 14 of the rim by a retaining ring 48, but since the external diameter of the support portion 14 is smaller than that of the support portion 12 an annular spacing element 50 is interposed between the bead seat element 36 and the rim support portion 14 and retaining ring 48. The spacing element 50 engages an O-ring 52 corresponding to the O-ring 44, for air tightness It will be noted in relation to the bead seat element 36 that it contacts the wheel rim only in the vicinity of the support portion 14 of the rim. Since all forces between the tyre and bead seat element act in the region of the abutment part of the bead seat element, there is no requirement for support of the part of the bead seat element nearest the centre region of the wheel. However, it would be possible to omit the spacing element 50 and instead utilise a different configuration of bead seat element 36, of greater dimensions in the radial direction. The retaining ring 48 is smaller than the retaining ring 22.

As illustrated, the transition element 30 is off-set from the region of the wheel centrally between its two edge, towards the support portion of the wheel which is of larger diameter. In principle, the transition element could be disposed at any convenient position between the edges of the wheel, where it does not have any adverse effects on the function of the other parts of the wheel. As illustrated, the wheel disc 16 by which the wheel is mounted on the hub of an axle could be at any convenient position between the edges of the wheel. Possibly the disc 16 could be connected to the interior of the transition element. Instead of there being a separate transition element, the transition surface could be provided on one or other of the parts of the rim which afford the support portions 12, 14 thereof.

The frusto-conical transition surface 32 is inclined at an angle sufficiently great, relative to the axis of rotation of the wheel, to ensure that a component such as a bead seat element being passed over the transition surface from the smaller diameter to the larger diameter of the wheel is unlikely, if it should tilt and become misaligned, to get stuck on the transition surface.

Figure 3:
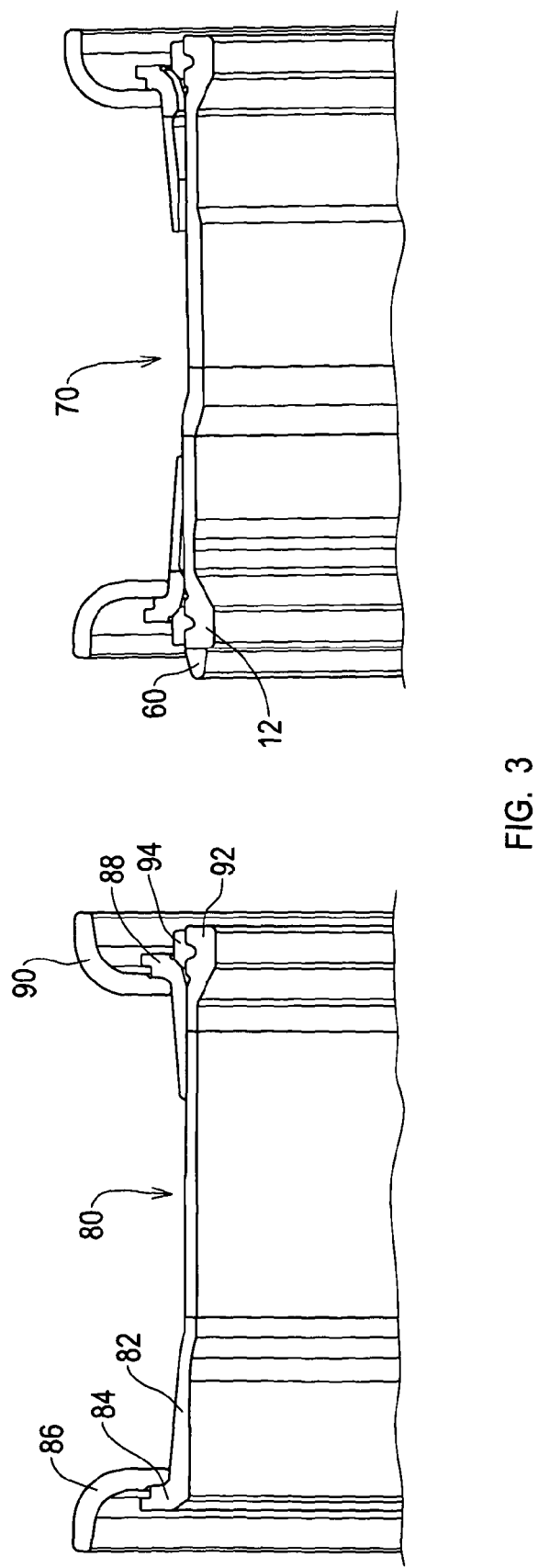
FIG. 3 is a sectional view as FIGS. 1 and 2, of a wheel in accordance with the invention in juxtaposition with a conventional wheel in a twin-wheel assembly.

Referring now to FIG. 3 of the drawings, this illustrates a wheel in accordance with the invention disposed in juxtaposition with a conventional wheel, in a twin wheel installation. In FIG. 3, a wheel as above described, in accordance with the invention, is indicated at 70, forming the outboard wheel of the twin wheel assembly, while a conventional wheel, forming the inboard wheel of the assembly, is indicated at 80. The conventional wheel 80 comprising a rim 82 with a fixed bead seat formation 84 at its inboard edge, supporting a flange 86. At its outboard edge, a removable tyre bead seat element 88 carrying a flange 90 is retained on a support portion 92 of the rim 82 of the wheel by a retaining ring 94. The support portion 12 of the wheel 70 according to the invention is the same diameter as the support portion 92 of the inboard conventional wheel 80.

When the tyre fitted to the inboard wheel 80 has to be removed, assuming this is to be done without removing the wheels as a whole from the axle, it is first necessary to remove the tyre and associated tyre-supporting components from the outboard wheel 70. This is done firstly by removing the retaining ring 48 at the outboard edge of the wheel 70, followed by the removal of the bead seat element 36 and flange 37. Then it is possible to remove the tyre, followed by the bead seat element 34 and flange 35, then the retaining ring 22. Access to the inboard wheel 80 is then possible, with the retaining ring 94 firstly being removed followed by the bead seat element 88 and flange 90. These components are passed across the gap between the rims of the wheels 80, 70, and in the course of this process the guide member 60 extending a small distance across the gap is of assistance. The frusto-conical surface 62 of the guide member 60 helps alignment of the retaining ring 94 and bead seat element 88 removed from the wheel 80 with the rim of the wheel 70, to be able to pass over the external diameter of the support portion 12 thereof. Then it is possible to remove the tyre from the wheel 80, again passing over the gap between the adjacent edges of the wheels and over the wheel 70.

When the tyre is to be replaced on the inboard wheel 80, it is first placed on the outboard end of the wheel 70, which positioning is relatively easily accomplished since the outboard end of the rim of the wheel 70 is of smaller diameter than the inboard end. As the tyre is moved to the inboard end of the wheel 70, it passes over the transition surface 32 thereof to be aligned on the larger diameter part of the rim of the wheel 70. This, in turn aligns it with the rim of the wheel 80, facilitating its movement across the gap between the wheels. Subsequently the tyre-supporting components at the outboard edge of the wheel 80 are replaced, in the reverse order of their removal.

It will therefore be appreciated that the above-described features of a wheel in accordance with the invention are of significant assistance in performing tyre-changing operations of twin wheel installations, with the wheels in situ.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A twin-wheel arrangement for a vehicle, comprising:
    an outboard wheel having an outboard wheel rim, the outboard wheel rim having an inboard edge, an outboard edge, an inboard support portion disposed adjacent the inboard edge, and an outboard support portion disposed adjacent the outboard edge;
    the inboard support portion of the outboard wheel rim having a first diameter and the outboard support portion having a second diameter, the first diameter greater than the second diameter;
    the outboard wheel rim including an inboard tire bead seat element removably mounted to the inboard support portion and an outboard tire bead seat element removably mounted to the outboard support portion;
    an inboard wheel having an inboard wheel rim, the inboard wheel rim having an outboard support portion adjacent an outboard edge, the inboard wheel rim including an annular outboard tire bead seat element removably mounted to the outboard support portion; and
    wherein the outboard support portion of the inboard wheel rim is of substantially the same diameter as the inboard support portion of the outboard wheel rim;
    wherein, on the outboard wheel rim, the inboard and outboard tire bead seat elements have the same diameter; and the outboard wheel rim includes an annular spacer disposed between the outboard support portion of the outboard wheel rim and the outboard tire bead seat element of the outboard wheel rim; and
    wherein an external peripheral surface of the outboard wheel rim includes a transition surface of gradually changing diameter, the transition surface disposed axially between the axially-spaced support portions and axially between the inboard and outboard tire bead seat elements and
    wherein the outboard wheel rim includes a wheel disc, and wherein the transition surface is axially displaced from the wheel disc.

2. The twin-wheel arrangement according to claim 1 wherein the transition surface is frusto-conical.

3. The twin-wheel arrangement according to claim 2 wherein the inclination of the transition surface is resistant to frictional self-locking with a component engaging the transition surface.

4. The twin-wheel arrangement according to claim 1 wherein the transition surface is provided on a separate transition element, the separate transition element connected to respective ring parts affording the axially-spaced support portions.

5. The twin-wheel arrangement according to claim 1 wherein an inboard edge of the outboard wheel rim is provided with a guide formation extending axially therefrom, the guide formation having a guide surface tapering from a diameter substantially equal to the overall diameter of the inboard edge of the outboard wheel rim.

6. The twin-wheel arrangement according to claim 5 wherein the guide surface is generally frusto-conical.

* * * * *